United States Patent Office 2,990,337
Patented June 27, 1961

2,990,337
GIBBERELLIC ACID MANUFACTURE

Christopher Towers Calam and Ian Stewart Nixon, Alderley Park, Macclesfield, England, assignors to Imperial Chemical Industries Limited, London, England, a corporation of Great Britain
No Drawing. Filed Aug. 29, 1958, Ser. No. 757,924
Claims priority, application Great Britain Sept. 9, 1957
8 Claims. (Cl. 195—36)

This invention relates to antibiotic manufacture and more particularly it relates to a process for the manufacture of gibberellic acid.

Gibberellic acid is a plant growth stimulant obtainable from the culture filtrates of certain active strains of the mould *Gibberella fujikuroi* (*Fusarium moniliforme*). It is known to manufacture gibberellic acid by cultivating an active strain of *Gibberella fujikuroi* in a suitable nutrient medium containing a source of carbon for example glucose, a source of nitrogen for example ammonium nitrate, certain metallic salts for example magnesium sulphate and potassium dihydrogen phosphate and traces of metals such as iron, copper, zinc, manganese and molybdenum. The known nutrient media used for such manufacture are so-called synthetic media in that for example the source of nitrogen for example an ammonium salt or a nitrate, is not of organic origin.

We have now found that a suitable nutrient medium for the production of gibberellic acid by cultivation of an active strain of *Gibberella fujikuroi* may contain an organic substance as the suitable source of nitrogen.

Thus according to the inveniton we provide a process for the manufacture of gibberellic acid which comprises cultivating an active strain of *Gibberella fujikuroi* in a suitable nutrient medium wherein the source of nitrogen is an organic source.

As a suitable organic substance which may be used as a source of nitrogen there may be mentioned for example substances of animal or plant origin such as plant meals including soya flour or meal, cotton seed meal, peanut meal, wheat germ meal, linseed meal and the like; plant waste materials such as corn steep liquor, animal proteinallous material such as beef extract (one variety commonly available is known as "Lemco"), peptone, liver powder and the like; autolysates of proteinallous material such as yeast autolysates (varieties commonly available are known as "Marmite" and "Yeastrel"), and wheat flour. Extracted soya meal is a commonly available product and is the mealy residue remaining from soya flour after extraction of the fatty material while linseed expeller cake meal is likewise the mealy residue remaining from linseed after removal of the oil or fatty material.

The organic substance may be used in the nutrient medium such that the concentration of nitrogen in the medium is within the range of 0.1 to 1.0% w./v., generally in the form of between 0.5 and 10% w./v. of organic substance, but the optimal concentration to be used varies from substance to substance. The yield of gibberellic acid is not dependent solely on the amount of nitrogen present in the organic substance possibly because all the nitrogen present in the said substance may not be utilised by the organism.

A suitable concentration of carbon in the nutrient medium may be within the range of 0.7 to 13% w./v. and more particularly within the range of 1.75 to 10.8% w./v. in the form of for example 5–30% w./v. of glucose monohydrate.

A suitable strain of *Gibberella fujikuroi* which may be used in the process of manufacture is strain 917 which has previously been used by us for the preparation of gibberellic acid. Other suitable strains or mutants thereof may be used. Samples of active strains of *Gibberella fujikuroi* have been deposited in the culture collections of the Commonwealth Mycological Institute, Kew, the Bureau voor Schimmelcultures, Baarn and the Northern Utilisation Research and Development Division of the United States Department of Agriculture, Peoria, Illinois, U.S.A.

The gibberellic acid formed in the fermentation medium may be isolated by filtration of the medium and extraction of the filtrate with an organic solvent or by adsorption with activated charcoal.

When the organic substances described above are used as the source of nitrogen in place of synthetic substances for example ammonium nitrate in the production of gibberellic acid by fermentation, the yield of gibberellic acid is increased and, with some of the said substances, the fermentation process becomes more reliable. Some of the organic substances for example corn steep liquor used in the fermentation medium contain not only nitrogen in the form of amino-acids but also other elements for example calcium, magnesium, potassium and traces of other metals and there is thus less likelihood of the mould being starved by lack of some essential element in the nutrient medium during the fermentation process.

It is to be understood that the organic substance used as a source of nitrogen may be supplemented if desired, by inorganic sources of nitrogen for example ammonium nitrate.

The invention is illustrated but not limited by the following examples:

EXAMPLE 1

*Preparation of inoculum*

A nutrient medium is prepared of the following composition:

| | Gm. |
|---|---|
| Glucose monohydrate | 120 |
| Ammonium nitrate | 4.8 |
| Magnesium sulphate | 1 |
| Potassium dihydrogen phosphate | 5 |
| Ferrous sulphate heptahydrate | 0.01 |
| Manganese sulphate tetrahydrate | 0.01 |
| Zinc sulphate heptahydrate | 0.01 |
| Copper sulphate pentahydrate | 0.01 |
| Water to make up to 1 litre. | |

This nutrient medium is distributed in 100 ml. portions into 500 ml. flasks which are then sterilised, cooled and inoculated with *Gibberella fujikuroi* strain No. 917. The flasks are then incubated at 24° C. on a rotary shaker for 4 days. A thick mycelial growth develops and this is then used for the main fermentation.

*Main fermentation*

A basic medium is prepared of the following composition:

| | Gm. |
|---|---|
| Glucose monohydrate | 6000 |
| Magnesium sulphate | 30 |
| Ammonium nitrate | 30 |
| Potassium dihydrogen phosphate | 150 |
| Ferrous sulphate heptahydrate | 0.3 |
| Manganese sulphate tetrahydrate | 0.3 |
| Zinc sulphate heptahydrate | 0.3 |
| Copper sulphate pentahydrate | 0.3 |
| Water to make up to 30 litres. | |

This basic medium is divided into two equal portions and each portion is placed in a stainless steel fermenter, fitted with a stirrer and an air inlet. To one fermenter are added 21 gm. of ammonium nitrate, and to the other fermenter is added corn steep liquor (containing 225 gm. of dry solids) as an additional nitrogen source. The fermenters are sterilised and kept at 24° C. and 3 flasks of the inoculum described above are added to each fermenter. The stirrers are run at 450 r.p.m. and air is passed through each fermenter at a rate of 20 litres/minute during the fermentation. It may be necessary to control foaming of the fermentation medium by adding small amounts of vegetable oil to the fermenters. Gibberellic acid is assayed at intervals and the results obtained are as follows:

| Age (days) | Fermentation with ammonium nitrate | | Fermentation with corn steep liquor | |
|---|---|---|---|---|
| | pH | gibberellic acid (mg./l.) | pH | gibberellic acid (mg./l.) |
| 5 | 3.75 | 107 | 4.90 | 146 |
| 7 | | 196 | | 294 |
| 10 | 3.66 | 278 | 4.35 | 458 |
| 12 | 3.65 | 431 | 4.52 | 547 |

It will be observed that the yield of gibberellic acid is higher and the pH of the fermentation medium is higher when the medium contains corn steep liquor as a source of nitrogen in addition to ammonium nitrate.

EXAMPLE 2

The inoculum is prepared by the process as described at the beginning of Example 1.

The fermentation is carried out according to the process as described in Example 1 using the basic medium (15 litres) to which is added corn steep liquor (equivalent to 225 gm. dry solids) as the source of nitrogen. The medium is harvested after 8 days when the filtered culture medium contains 372 mg./l. of gibberellic acid. The pH of the filtrate is adjusted to pH 2.5 and it is then extracted successively with 8, 4 and 2 litres of ethyl acetate. The ethyl acetate extract is concentrated in vacuo to 1270 ml. and this concentrate is then extracted twice with 250 ml. water containing 9 gm. potassium bicarbonate (pH of extract 6.5) and then with 250 ml. of water. The aqueous extracts are combined and after adjusting to pH 3.8 they are extracted three times with 250 ml. of ethyl acetate. The resulting ethyl acetate extract is concentrated in vacuo to 10 ml. when gibberellic acid (2.3 gm.) crystallises as characteristic white crystals, M.P. 233–235° C. with decomposition. A small second crop of acid is obtained on further concentrating the mother liquor.

EXAMPLE 3

Fermentations are carried out in shaken flasks in which the basic medium is as follows:

| | Percent |
|---|---|
| Glucose monohydrate | w./v 10 |
| Potassium dihydrogen phosphate | w./v 0.5 |
| Magnesium sulphate heptahydrate | w./v 0.1 |
| Minor element concentrate [1] | v./v 0.2 |

[1] The composition of the minor element concentrate is as follows:
Ferrous sulphate heptahydrate _____gm__ 16.3
Cupric sulphate pentahydrate _____gm__ 2.4
Zinc sulphate heptahydrate _____gm__ 16.3
Manganous sulphate tetrahydrate _____gm__ 1.6
Potassium molybdate pentahydrate _____gm__ 1.6
($K_2MoO_4.5H_2O$)
Water _____litres__ 1.2

To portions of the medium are added organic products in the concentrations given in the table below:

| | Percent used, w./v. | After 7 days' fermentation | |
|---|---|---|---|
| | | pH | Gibberellic Acid, mg./l. |
| Ammonium nitrate (control) | 0.25 | 3.5 | 231 |
| Corn Steep Liquor (as dry matter) | 2 | 5.7 | 318 |
| Yeast extract ("Marmite") | 2.5 | 4.2 | 275 |
| Yeast extract ("Yeastrel") | 4 | 4.1 | 217 |
| Do | 2.5 | 4.1 | 176 |
| Soya flour | 3 | 4.5 | 528 |
| Do | 2 | 3.9 | 420 |
| Extracted soya meal | 3 | 4.8 | 580 |
| Do | 2 | 4.0 | 298 |
| Linseed expeller cake meal | 3 | 4.0 | 422 |
| Do | 2 | 3.8 | 408 |
| Meat extract ("Lemco") | 3 | 5.5 | 219 |
| Do | 2 | 5.2 | 236 |
| Peptone | 1.5 | 3.5 | 527 |
| Do | 0.75 | 3.3 | 324 |
| Wheat flour (white) | 7.5 | 3.4 | 324 |
| Do | 5 | 2.95 | 451 |

When wheat flour (white) is used as the source of nitrogen, the glucose concentration in the nutrient medium is reduced to 5% because of the high carbohydrate concentration in the flour but all other ingredients of the nutrient medium remain the same.

50 ml. aliquots of these media are distributed in 500 ml. conical flasks which are plugged with cotton-wool and sterilised by heating with steam at 15 lbs./sq. in. pressure. The media are inoculated with 2 ml. of a mycelial suspension of *Gibberella fujikuroi* No. 917 (prepared by inoculating sterilised moist rice grains [10 gm. quantities in 6″ x 1″ test tubes] with the fungus and after 10 days' incubation at 25° C. and aerial mycelial growth is apparent, 20 ml. of water are added to each tube and the mycelium is brought into suspension by stirring with a sterile wire).

The inoculated flasks are incubated at 25° C. on a rotary shaker working at 250 revolutions per minute with a 2″ movement. After 7 days pairs of flasks are removed, the cultures combined and the pH and the gibberellic acid concentrations are measured. The results of this experiment are given in the table above. It will be observed that the yield of gibberellic acid is frequently higher when the source of nitrogen is 0.75–7.5% w./v. of one of the organic products than it is when the source of nitrogen is 0.25% w./v. of ammonium nitrate.

EXAMPLE 4

A medium is prepared according to the following composition:

| | Percent |
|---|---|
| Glucose | w./v 10 |
| Linseed expeller cake meal | w./v 2 |
| Potassium dihydrogen phosphate | w./v 0.3 |
| Magnesium sulphate heptahydrate | w./v 0.1 |
| Minor element concentrate [1] | v./v 0.2 |

[1] The composition of the minor element concentrate is the same as that given in Example 3.

15 litres of this solution are placed in a fermenter as described and used in Example 1. After sterilisation the medium is inoculated and stirred and aerated by the procedure as described in Example 1. After 7 days the concentration of gibberellic acid is measured and it is found to be 186 mg./litre.

EXAMPLE 5

A fermentation experiment is carried out by the procedure as described in Example 4, except that instead of the 2% w./v. of linseed expeller cake meal there is used 2% w./v. of extracted soya meal. The gibberellic acid produced reaches a concentration, after 6 days, of 248 mg./litre., after 7 days of 388 mg./litre and after 8 days of 364 mg./litre.

3.0 litres of filtered broth from the 8 days old culture is adjusted to pH 2.0 with dilute aqueous hydrochloric acid and is extracted twice with 600 ml. portions of methyl isobutyl ketone. The solvent extracts are combined and extracted with 100 ml. of water containing a slight excess of sodium bicarbonate, giving an aqueous extract of approximately pH 7. The organic solvent is further washed with two portions each of 50 ml. of water. The combined aqueous extract and washings are filtered and the filtrate is extracted with ethyl acetate. The filtrate is then adjusted to pH 3.0 and is extracted three times with 50 ml. of ethyl acetate. The three ethyl acetate extracts are combined and are washed with 10 ml. water, separated and dried over sodium sulphate. On concentration under reduced pressure to about 3 ml. crystals of gibberellic acid separate. They are removed by filtration, washed with ethyl acetate and dried in air, thus providing 0.633 gm. of gibberellic acid, M.P. 233–235° C., with decomposition.

What we claim is:

1. Process for the manufacture of gibberellic acid which comprises cultivating an active strain of *Gibberella fujikuroi* in a suitable nutrient medium wherein the source of nitrogen is a plant meal.

2. Process as claimed in claim 1 wherein the plant meal is soya meal.

3. Process as claimed in claim 1 wherein the plant meal is linseed meal.

4. Process as claimed in claim 1 wherein the plant meal is wheat flour.

5. Process as claimed in claim 1 wherein the plant meal is cotton seed meal.

6. Process as claimed in claim 1 wherein the plant meal is used such that the concentration of nitrogen in the medium is within the range of 0.1 to 1.0% w./v.

7. Process as claimed in claim 1 wherein the concentration of carbon within the nutrient medium is between 0.7 and 13% w./v.

8. Process as claimed in claim 1 wherein the plant meal used as the source of nitrogen is supplemented by an inorganic source of nitrogen.

References Cited in the file of this patent

UNITED STATES PATENTS

| | | |
|---|---|---|
| 2,842,051 | Brian et al. | July 8, 1958 |
| 2,918,413 | Redemann | Dec. 22, 1959 |